United States Patent [19]

Chen

[11] Patent Number: 5,530,571
[45] Date of Patent: Jun. 25, 1996

[54] TWO-PURPOSE LCD DEVICE WITH SCROLLABLE REFLECTING SCREEN AND SCROLLABLE DIFFUSING SCREEN

[76] Inventor: Hung-wen Chen, 4F., No.50, Lo-yeh Str., Ta-an Dist., Taipei, Taiwan

[21] Appl. No.: 369,475

[22] Filed: Jan. 6, 1995

[51] Int. Cl.$^6$ ............................ G02F 1/1335; F21V 17/02
[52] U.S. Cl. ............................ 359/69; 359/70; 362/278; 362/320
[58] Field of Search .................. 353/38, 97; 362/278, 362/320; 359/49, 69, 70, 83

[56] References Cited

U.S. PATENT DOCUMENTS 4,616,295  10/1986  Jewell et al. ............................ 359/70
4,909,604   3/1990  Kobayashi et al. ...................... 359/49

*Primary Examiner*—Anita Pellman Gross
*Assistant Examiner*—Walter J. Malinowski
*Attorney, Agent, or Firm*—Jacobson, Price, Holman & Stern

[57] ABSTRACT

A liquid crystal display device including a frame, a liquid crystal module and a back light module mounted within the frame, and a transparent backing covered on the frame over the back light module, the back light module consisting of a diffusion scroll, a reflecting scroll, and a photo conductive plate disposed between the diffusion scroll and the reflecting scroll, the diffusion scroll including a diffusion screen and a transparent screen connected in series, the reflecting scroll including an opaque reflecting screen and a transparent screen, the frame having rotary knobs turned to rotate the diffusion scroll and the reflecting scroll, permitting the diffusion screen and the opaque reflecting screen to be aligned with the liquid crystal module for image displays, or permitting the transparent screens to be aligned with the liquid crystal module for slide projections.

1 Claim, 2 Drawing Sheets

TWO-PURPOSE LCD DEVICE WITH SCROLLABLE REFLECTING SCREEN AND SCROLLABLE DIFFUSING SCREEN

BACKGROUND OF THE INVENTION

The present invention relates to liquid crystal displays, and relates more particularly to such a liquid crystal display which is functional for data and image displays as well as for slide projections.

regular liquid crystals are commonly used for making display screens by fastening a liquid crystal module to the front side of a back light module to form a reflection type liquid crystal display (LCD) module. The back light module comprises a photo conductive plate having both sides respectively covered with an opaque reflecting plate and a diffusion plate. Because the back light module does not allow light to pass, a liquid crystal display can only be used for data and image displays (for example, for use in LCD type television sets, display units for notebook computers). Because the viewing areas of conventional liquid crystal displays are small, regular liquid crystal displays are suitable only for personal uses. Furthermore, LCD slide projectors and LCD projection slides have now become more and more popular, however these devices can only be used for image projections, but cannot be used as display screens.

SUMMARY OF THE INVENTION

The present invention has been accomplished under the circumstances in view. It is therefore the major object of the present invention to provide a two-purpose liquid crystal display device which is functional for data and image displays as well as for slide projections. According to the preferred embodiment of the present invention, the back light module is comprised of a diffusion scroll, a reflecting scroll, and a photo conductive plate disposed between the diffusion scroll and the reflecting scroll. The diffusion scroll includes a diffusion screen and a transparent screen connected in series. The reflecting scroll includes an opaque reflecting screen and a transparent screen. By turning the reflecting scroll and the diffusion scroll relative to each other to align the diffusion screen and the opaque reflecting screen with the liquid crystal module, the LCD is set for image reflection type displays. When the reflecting and diffusion scrolls are turned to align the transparent screens with the liquid crystal module, the LCD is set for slide projections.

BRIEF DESCRIPTION OF THE DRAWINGS

The present invention will now be described by way of example with reference to the annexed drawings, in which.

DETAILED DESCRIPTION OF THE PREFERRED EMBODIMENT

Figure 1:
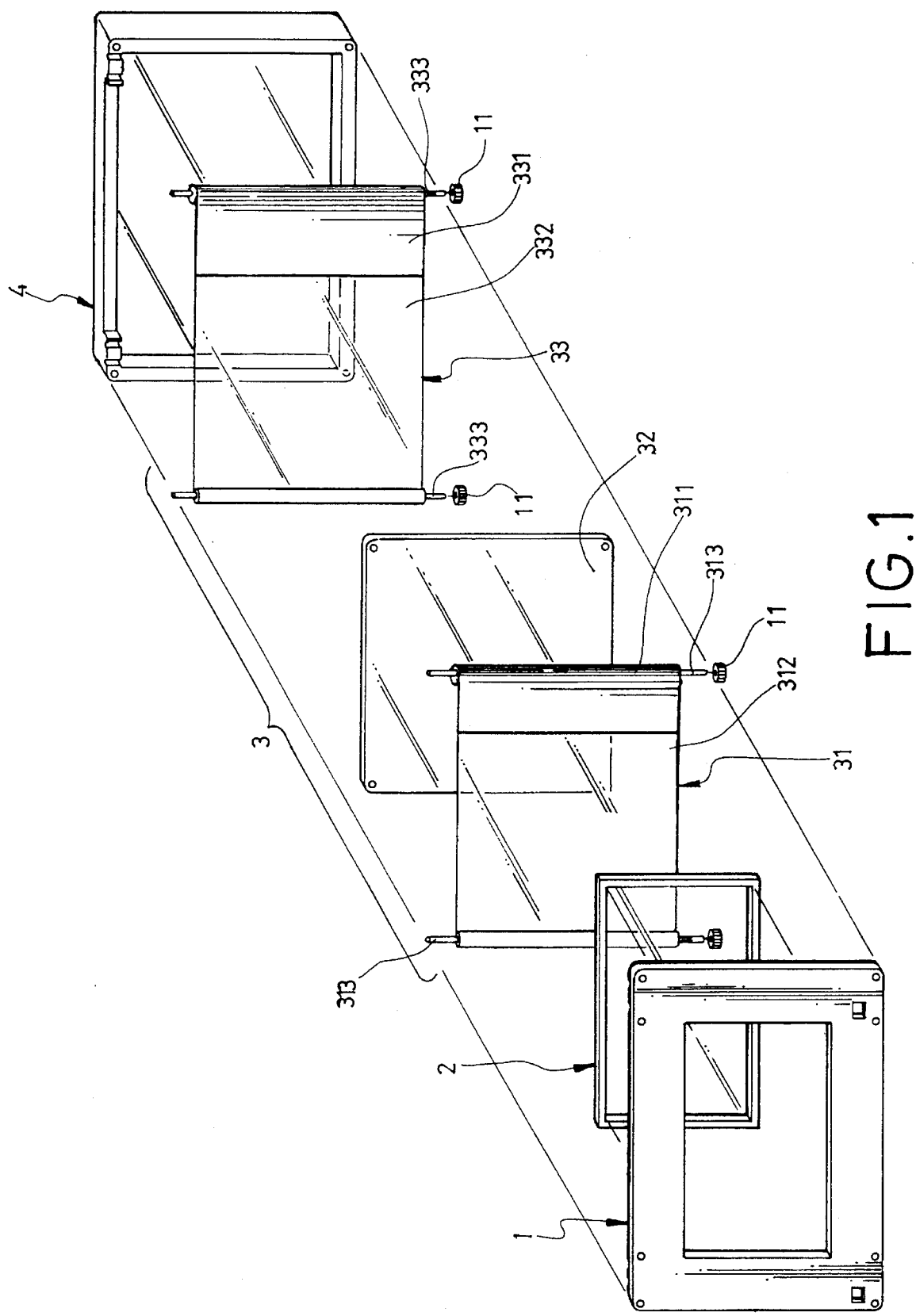
FIG. 1 is an exploded view of a two-purpose liquid crystal display device according to the present invention.
Figure 2:
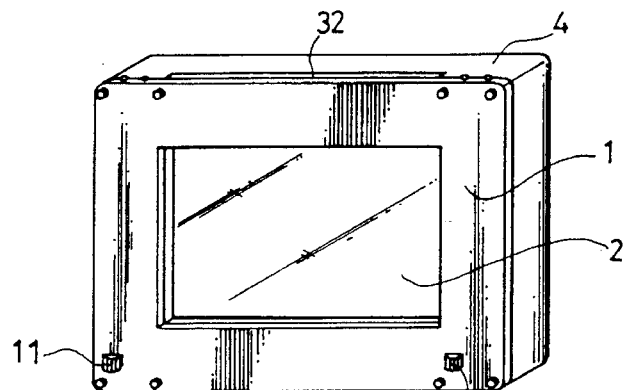
FIG. 2 is an elevational view of the two-purpose liquid crystal display device shown in FIG. 1.

Referring to FIGS. 1 and 2, a two-purpose liquid crystal display device in accordance with the preferred embodiment of the present invention is generally comprised of a frame 1, a liquid crystal module 2, a back light module 3, and a backing 4. The liquid crystal module 2 and the back light module 3 are mounted within the frame 1, and the backing 4 is fastened to the frame 1 and covered over the back light module 3 to hold down the liquid crystal module 2. The back light module 3 comprises a diffusion scroll 31, a photo conductive plate 32, and a reflecting scroll 33. The diffusion scroll 31 comprises two reels 313, a diffusion screen 311 and a transparent screen 312 connected in series between the reels 313. The reflecting scroll 33 comprises two reels. 333, an opaque reflecting screen 331 and a transparent screen 332 connected in series between the reels 333. The frame I comprises a plurality of rotary knobs 11 respectively coupled to the reels 313 and 333 of the back light module 3 and partially extended out of the outside surface of the frame 1 for turning diffusion scroll 31 and the reflecting scroll 33, permitting the diffusion screen 311 or transparent screen 312 of the diffusion scroll 31 to be aligned with the opaque reflecting screen 331 or transparent screen 332 of the reflecting scroll 33 (see FIGS. 3 and 4). The backing 4 is made from light permeable material, or preferably from transparent material.

Figure 3:
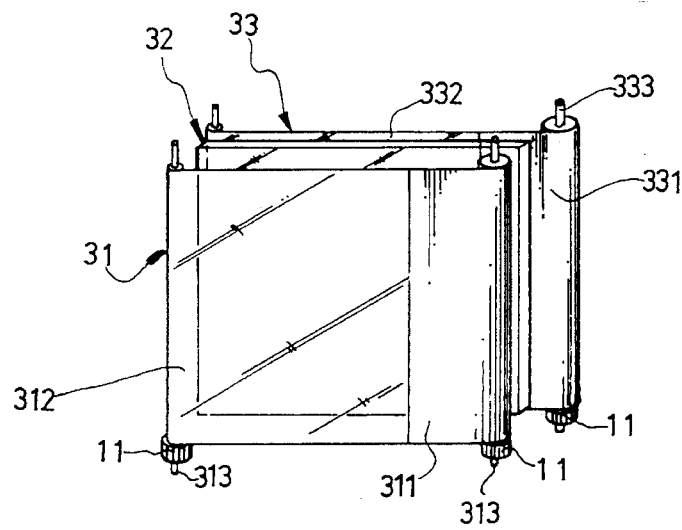
FIG. 3 shows the arrangement of the back light module for the two-purpose liquid crystal display device shown in FIG. 1.
Figure 4:
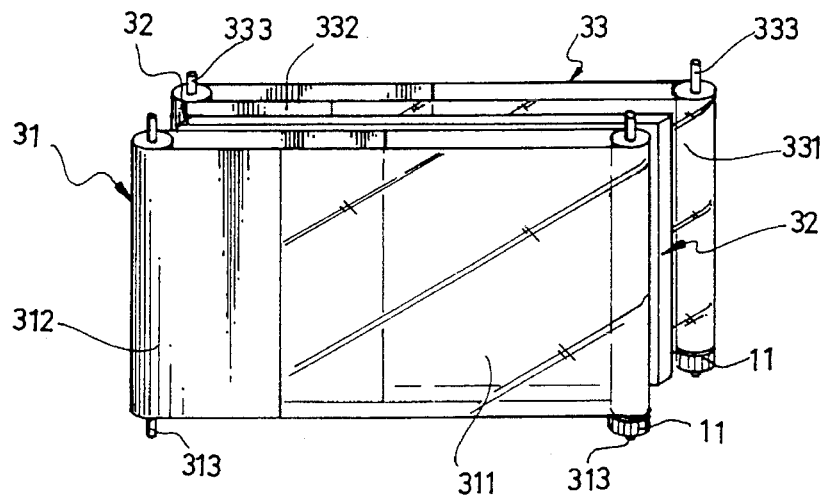
FIG. 4 is similar to FIG. 3 but showing the diffusion scroll adjusted relative to the reflecting scroll.

Referring to FIGS. 3 and 4, when the liquid crystal module 2 is to be used for the display mode, the diffusion scroll 31 and the reflecting scroll 33 are turned relative to each other to let the diffusion screen 311 and the opaque reflecting screen 331 be aligned, and therefore the apparatus is arranged into the reflection type LCD mode; when the liquid crystal module 2 is to be used for the slide projection mode, the diffusion scroll 31 and the reflecting scroll 33 are adjusted relative to each other to let the transparent screens 312 and 332 be aligned, and therefore the apparatus is arranged into the slide projection mode.

It is to be understood that the drawings are designed for purposes of illustration only, and are not intended as a definition of the limits and scope of the invention disclosed.

What is claimed is:

1. A liquid crystal display device of the type comprising a frame, a liquid crystal module mounted within said frame, a back light module mounted within said frame and covered on said liquid crystal module, and a backing fastened to said frame and covered on said back light module, wherein: said back light module comprises a diffusion scroll, a reflecting scroll, and a photo conductive plate disposed between said diffusion scroll and said reflecting scroll, said diffusion scroll comprising two reels, a diffusion screen and a transparent screen connected in series between the reels of said diffusion scroll, said reflecting scroll comprising two reels, an opaque reflecting screen and a transparent screen connected in series between the reels of said reflecting scroll; said frame comprises a plurality of rotary knobs respectively fixedly coupled to the reels of said reflecting scroll and said diffusion scroll for turning said reflecting scroll and said diffusion scroll, permitting said diffusion screen to be aligned with said opaque reflecting screen or permitting the transparent screen of said diffusion scroll to be aligned with the transparent screen of said reflecting scroll; said backing is made from transparent material.

* * * * *